Nov. 28, 1933.  M. W. BRUESHABER  1,937,494

STEREOTYPING PROCESS AND MECHANISM

Filed Feb. 26, 1929   10 Sheets-Sheet 1

INVENTOR.
M. W. Brueshaber
BY John D. Morgan
ATTORNEY

Nov. 28, 1933. M. W. BRUESHABER 1,937,494
STEREOTYPING PROCESS AND MECHANISM
Filed Feb. 26, 1929 10 Sheets-Sheet 6

INVENTOR.
M. W. Brueshaber
BY John D. Morgan
ATTORNEY.

Patented Nov. 28, 1933

1,937,494

UNITED STATES PATENT OFFICE 1,937,494

STEREOTYPING PROCESS AND MECHANISM

Martin W. Brucshaber, Chicago, Ill., assignor to Goss Printing Press Company, a corporation of Illinois Application February 26, 1929. Serial No. 342,836

9 Claims. (Cl. 22—2)

This invention relates to a novel and useful mechanism for producing, treating and disposing of stereotype plates and for improving, controlling and correlating the stereotyping operations generally in connection with the operation of the press room of a newspaper or other printing plant.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

The invention is directed to handling, controlling and correlating the entire cycle of stereotyping and press room operations, and performing them in an easy, new, speedy, efficient and otherwise improved manner, and probably finds its largest and best field of application in connection with the press room of large newspapers.

The invention provides a new and useful mechanism and mechanical system for treating and disposing of the used stereotype plates as they are discarded from the press after they have fulfilled their usefulness, and for the replenishment therefrom of the metal maintained in a molten condition in the reservoir of the stereotype plate casting machine for the casting of new stereotype plates without manual handling of the plates or direct supervision. In accordance with certain features of the invention, and preferentially in practice, the disposal of the used and discarded stereotype plates and the replenishment therefrom of the reservoir of molten metal are effected substantially automatically, the disposal of the used plates being in sequential or proportional relation to the changing and discarding of plates at the press, and the replenishment of the molten metal supply being likewise in sequential and proportional relation to the rate of making new stereotype plates, at any time and under any particular conditions of running of the presses. The invention is especially efficient and advantageous as employed with a plurality of stereotype casting mechanisms and a plurality of presses operating as a single production unit.

By the present invention, the used plates are discarded from the printing press at the press side whenever the edition for which they were prepared has been completed, and without further attention are conveyed away and stored as reserves, and by means of these variable reserves, the rate at which they are discarded ceases to be a material factor in the control and management of the press room, and all manual storing and personal supervision of the discarded plates are obviated. The plates forming these reserves are then resupplied to the melting pots or molten metal reservoirs of one or a plurality of plate casting mechanisms, at such a rate as may be necessary to maintain a substantially full supply of molten metal, irrespective of the variations in the rate of casting new plates or of discarding of used plates from the press.

Preferably, individual reserves of used and discarded plates are maintained adjacent to the melting pots of the several casting mechanisms, where a plurality of such mechanisms are employed, and these separate and individual reserves are kept replenished with plates automatically and without attention on the part of the operators.

As indicated, the usual manual handling of the used plates, such as carrying them to and putting them into the melting pot of the casting machine or machines is avoided. Thereby is obviated not only the manual labor heretofore required, but also the necessity for supervision of these various, and other allied, operations. Further than this, by my invention the entire production of new and the disposal of used and discarded stereotype plates is transformed into a self-regulating and automatically correlating system, accommodating itself to the changes in the press room conditions attendant on getting out the successive editions, and also insuring, at all times, a constant and sufficient supply of stereotype metal of substantially uniform temperature and condition in all the molten metal reservoirs of the several plate casting mechanisms.

My invention comprises, as preferentially and broadly considered, a mechanism for conveying away from the press side the used and discarded stereotype plates, for automatically storing said plates in some suitable manner and for replenishing the melting pots of one or more stereotype plate casting machines from said storage of reserve plates in substantial proportion to the withdrawal of molten metal from the respective melting pots dependent upon the rate at which plates are cast by the corresponding plate casting mechanisms.

In the present preferred embodiment and manner of practicing my invention, the used stereotype plates discarded at the press side are automatically conveyed away to one or more individual reserves adjacent to the molten metal reservoirs of one or more casting boxes, and from these individual reserves the plates are supplied to the melting pots or molten metal reservoirs of the casting boxes as new plates are cast therefrom. Thereby the rate of disposal of the discarded plates from the press is rendered independent, in a mechanical system, of the current rate of casting new plates.

Preferably the supply of plates to the melting pots of the casting machines is effected automatically and by, or concurrently with, the pumping of metal from the melting pot into the stereotype mold, and in compensating quantity. Thus the replenishment of molten metal for any or all of the casting machines is automatic, is proportional to the withdrawal of such metal in plate casting, and is entirely independent, in a mechanical system from the rate of discarding the used plates at the presses.

It will be understood that the foregoing general description and the following detailed description as well, are explanatory and exemplary of the invention, but are not restrictive thereof.

Referring now in detail to the embodiment of the invention, as illustrated in the accompanying drawings, the invention is shown applied to the press-room of a large daily newspaper. Three presses 20, 21, 22 of the now commonly used "unit type" are shown in side by side relation, each press consisting of a plurality of perfecting units 24 arranged in single horizontal series with folding mechanisms 25 interposed in the series in a well known manner. The stereotype plate casting means, diagrammatically illustrated, comprises four units 27, 28, 29, and 30 of the double junior auto-plate type, although any other suitable casting mechanism may be employed. Each of these plate-casting units is provided with a corresponding plate-finishing mechanism, numbered 32, 33, 34 and 35. These plate finishing units, respectively, discharge the finished plates onto a conveyor 38, which may be of any known or other suitable form, which conveyor passes along the sides and around the ends of the several presses to convey the new stereotype plates thereto, and to receive and convey away therefrom the used and discarded stereotype plates 39 as they are removed from the press.

In accordance with my invention, automatically maintained reserves of metal in the form of used and discarded stereotype plates are maintained, varying in quantity with the changes in the press-room conditions so far as regards the discarding of old plates from the presses and the putting on of new. In the preferred form of my invention, I maintain individual reserves of the used and discarded stereotype plates corersponding to the several stereotype plate casting mechanisms, the several reserves being periodically replenished with stereotype plates as they are discarded from the press.

The plate casting means exemplarily shown herein are the double junior auto-plate units, each of these units having two independently operable casting mechanisms 40, 41 and each of these having its own melting pot 43 or reservoir of molten stereotype metal. As embodied, there is provided above each of these stereotype plate casting units an individual reserve hopper 45 for storing the used plates in stacked relation, and provided with discharging mechanisms whereby the used plates can be singly delivered from the hopper to the melting pot of the corresponding plate-casting mechanism, independently of the operation or needs of the others, thereby to compensate for the depletion of the respective hot metal reservoirs by reason of the casting of new plates by the corresponding plate-casting machines.

As preferably embodied, a common supply means for all the individual reserve devices 45 is provided and, as shown, said means comprise a conveyor 47, which in its particulars of construction may be of any known or other suitable form, and is shown conventionally. As illustrated, conveyor 47 comprises a longitudinally extending series of closely-spaced, parallel rollers 49, journaled at their ends in longitudinally-extending end frames 50, each of the rollers 49 at one of its ends being provided with a small sprocket wheel 52 over which runs an endless sprocket chain 53 in engagement with the teeth of the sprocket-wheels 52, the chain being driven from a suitable source of power 54.

For maintaining the chain 53 in driving engagement with each of the several sprocket wheels, thereby insuring the positive rotation of each of the conveyor rollers for travelling the used plates along the conveyor, there are provided small idlers 55, between each pair of adjacent rollers 49, depressing the chain between the sprocket wheels and preventing its rising and slipping over the teeth of the several sprockets. Cooperating with this longitudinally-extending conveyor 47 is a shorter, upwardly-inclined conveyor for lifting the plates from the conveyors running between the several presses and delivering them to the longitudinally extending conveyor running over the melting pots of the casting mechanisms. As embodied, this supplementary conveyor comprises an upwardly-inclined flight 57, which may be of the same general construction as the longitudinally-extending conveyor 47 or of any other known or desired construction, and is positioned with its receiving end adjacent the discharging end of conveyor 38 running between the several presses, so that as the plates are discarded from the presses, they are travelled by conveyors 38 and automatically transferred to the supplementary conveyor 57.

At its upper end, and connecting the supplementary conveyor with the longitudinally-extending conveyor is a short downwardly-inclined conveyor 59, comprising parallel end frames 63, at right angles to the longitudinally-extending conveyor 47, in which end frames are journalled a series of parallel, freely rotatable, closely spaced rollers, over which the used plates, delivered by the supplementary conveyor, can slide under the influence of gravity and be delivered onto the driven rollers 49 of conveyor 47, by which the plates are travelled until diverted into one of the individual reserve hoppers 45 corresponding to one of the casting mechanisms.

Referring now in detail to the embodied form of the means for individually storing and supplying the used and discarded plates to the melting pots of the stereotype plate casting mechanisms, a hopper is provided in which the plates are stored in stacked relation above the melting pots. The hopper comprises a frame 60, supported directly above the melting pot 43 of a plate-casting mechanism, having upwardly extending spaced-apart side-wall members 61, at the top and bottom of which are rotatably journalled shafts 63, on which are pinned sprocketwheels 64 and 65. Between vertically-alined pairs of sprocket wheels extend endless chains 66, 67, which together with the side walls 61 of the hopper prevent lateral movement of the stacked plates 39. Means are provided for supporting the bottom of the stack of reserve plates and, as preferably embodied, comprise retractible bolts 70, at opposite sides of the bottom portion of the hoppers 45 and projecting inwardly to engage the under side of the ends of the bottom plate 71.

Figure 5:
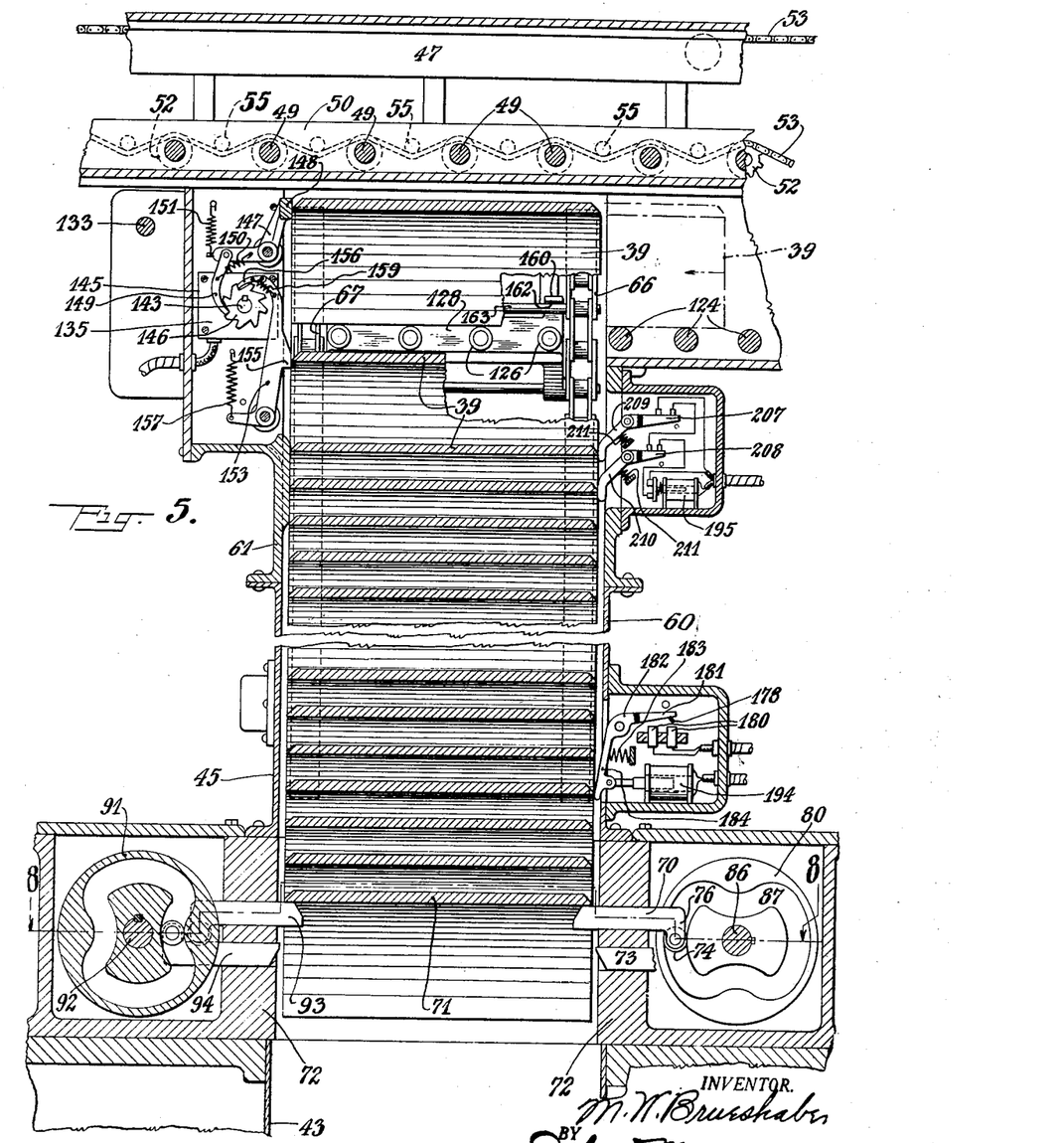
Fig. 5 is a section taken on the line 5—5 of Fig. 4 showing the plate storing or reserve mechanism.
Figure 6:
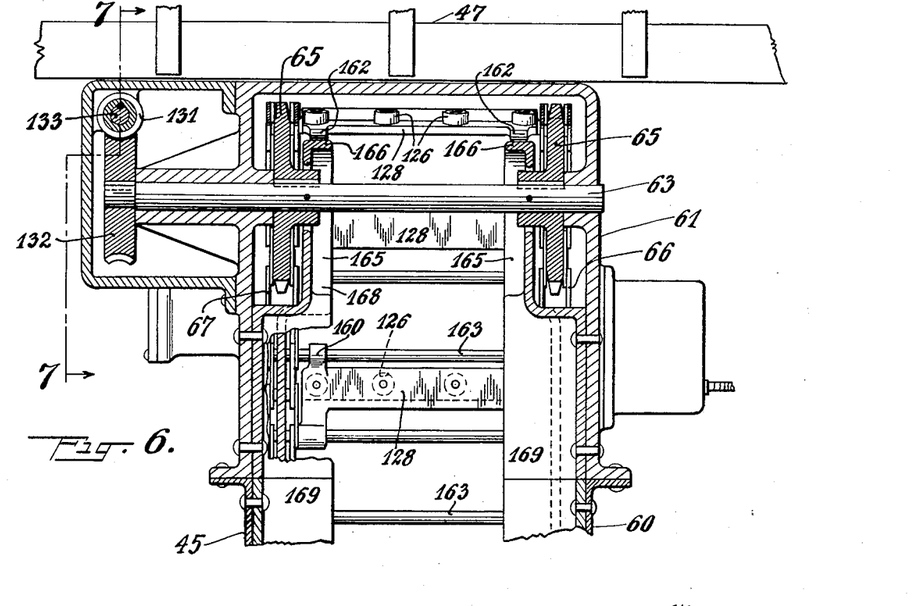
Fig. 6 is a section taken on the line 6—6 of Fig. 4.
Figure 7:
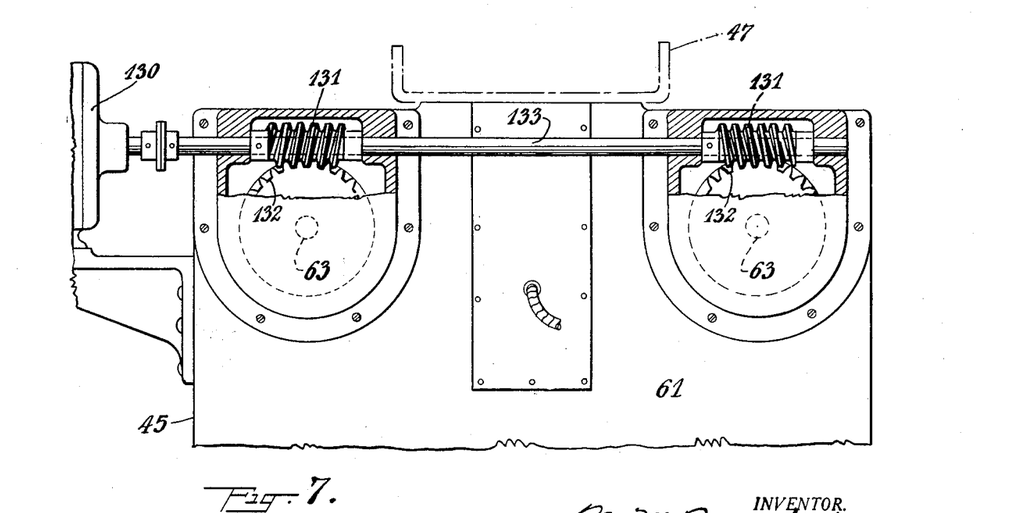
Fig. 7 is an elevation, partly in section, and taken on the line 7—7 of Fig. 6.

Means are provided for supplying plates from the individual reserves of used and discarded plates to the melting pot 43 of a casting mechanism and preferably comprise means for releasing plates one-by-one from the bottom of the stack of plates stored in the reserve hopper. In the present embodiment, bolts 73 are slidably mounted in the bottom walls 72 of the hopper directly below bolts 70 and at a distance slightly less than the distance between the plates, as stacked, and bolts 73 are projected into the path of the downwardly moving stack of plates as bolts 70 are retracted to lower the pile and thereby support the stack by engagement with the lower projected bolts 73. For effecting reciprocation of bolts 70 and bolts 73, in the manner specified, said bolts are provided at their outer ends with cam rollers 74, 75, respectively rotatably journalled on arms 76, 77 formed integral with the bolts 70 and 73. Cam discs 80 and 81 are rotatably mounted in journals 83, 84 at the bottom of the hopper 45, by means of shafts 86, to which they are keyed and each cam disc 80 and 81 is provided with a cam groove 87 in which the corresponding cam roller 74 or 75 runs. The cam grooves 87 in each disc are of similar shape, as best shown in Fig. 5, but cams 80 and 81 are fixed at 90 degrees with respect to each other so that as bolt 70 is projected bolt 73 is retracted, and vice versa.

At the other side of the bottom portion of hopper 45 is provided a similar pair of cams 90, 91 mounted on rotatable shaft 92, and operating bolts 93 and 94. For conjoint operation of the cam discs 80, 81, 90 and 91 and for insuring that the corresponding bolts 70, 73, 93 and 94 at opposite sides of the hopper will be operated in unison, shafts 86 and 92 are provided at one end with bevel gears 97, 98 meshing with bevel gears 99 and 100, respectively, mounted on rotatable shaft 101 extending transversely of the hopper 45. By reason of this construction, bolts 70 and 93 are simultaneously projected or retracted while bolts 73 and 94 are moved in an opposite manner, and after bolts 70 and 93 have been withdrawn, causing the bottom plate 71 to be supported by bolts 73 and 94, the cams 80, 81, 90 and 91 are rotated 90 degrees, causing the bolts to have an opposite movement, whereby bolts 70 and 93 are projected into the path of the stack of plates to support the stack of plates by engagement with the underside of the second plate, and bolts 73 and 94 are withdrawn allowing the bottom plate 71 to drop into the molten metal reservoir or melting pot of the corresponding casting mechanism.

Means are provided for synchronizing the release of used and discarded plates from the individual reserve hoppers as above described, with the casting of plates by the plate-casting mechanism, whereby an amount of stereotype metal, substantially equal to that withdrawn in the casting of each new plate, is supplied to the melting pot of the plate casting mechanism each time a plate is cast thereby and as here embodied comprise means for rotating cams 80, 81, 90 and 91, for releasing plates from the hopper, by movement of the casting lever 110 of the corresponding casting mechanism. In the usual form of casting mechanism, as previously described, a lever is provided at the top of the casting mechanism, and oscillation of this lever sets the casting mechanism into operation and results in the casting of a plate.

Figure 9:
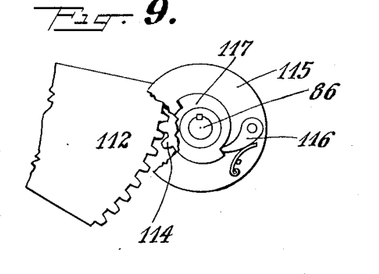
Fig. 9 is a detail view, with certain parts broken away, and taken on the line 9—9 of Fig. 8.

In the present form of the invention, this casting lever 110 is formed with a gear segment 112 at one end, and concentric with the pivot of the lever and the teeth of this gear mesh with pinion 114, rotatably mounted on cam shaft 86. Keyed to the pinion 114 is disc 115, carrying pawl 116, spring-pressed into engagement with the teeth of ratchet 117 rigidly secured to cam shaft 86, so that a downward movement of casting lever 110 will rotate disc 115, clockwise as shown in Fig. 9, causing all of cam discs 80, 81, 90 and 91 to be turned in unison one-half a revolution with the consequent release of a single plate from the individual reserve hopper. During the return movement of lever 110 to its normal, or upper, position, pawl 116 rides over the ratchet 117 and does not cause release of a plate.

Means are provided, in connection with the above-described mechanism, for replenishing the individual reserves of used and discarded plates, as the reserves are depleted by the casting of new plates and the corresponding withdrawal of plates from the bottom of the reserve hoppers to replenish and maintain constant the amount of molten metal contained in the melting pot or reservoirs of the plate casting mechanisms, and, as preferably embodied, comprise means for diverting used and discarded plates from the horizontally-extending conveyor and supplying them to the top of the individual reserve hoppers, where they are stacked, one-by-one, on top of the plates remaining in the hopper.

Figure 1:
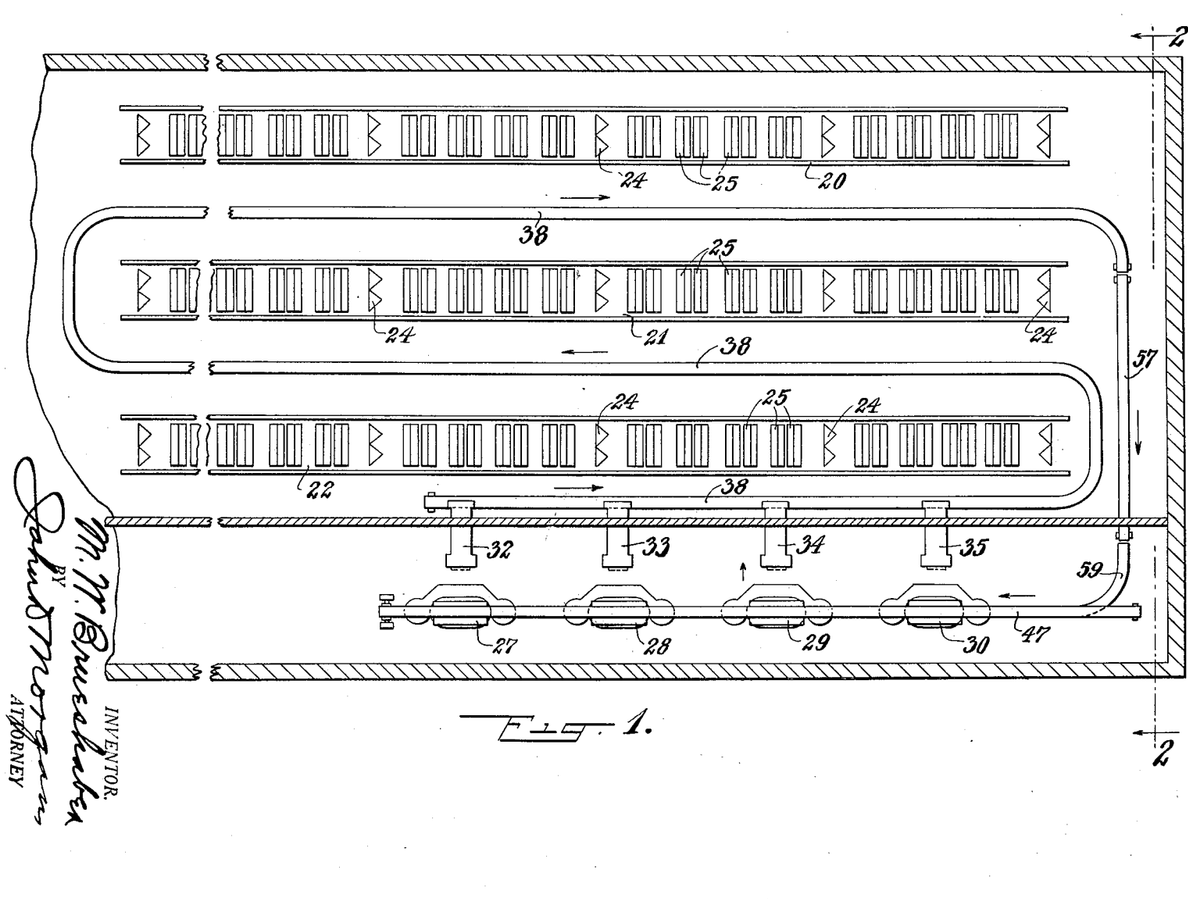
Fig. 1 is a diagrammatic plan of a part of the press room of a newspaper and illustrates in like manner an embodiment of the invention.
Figure 2:
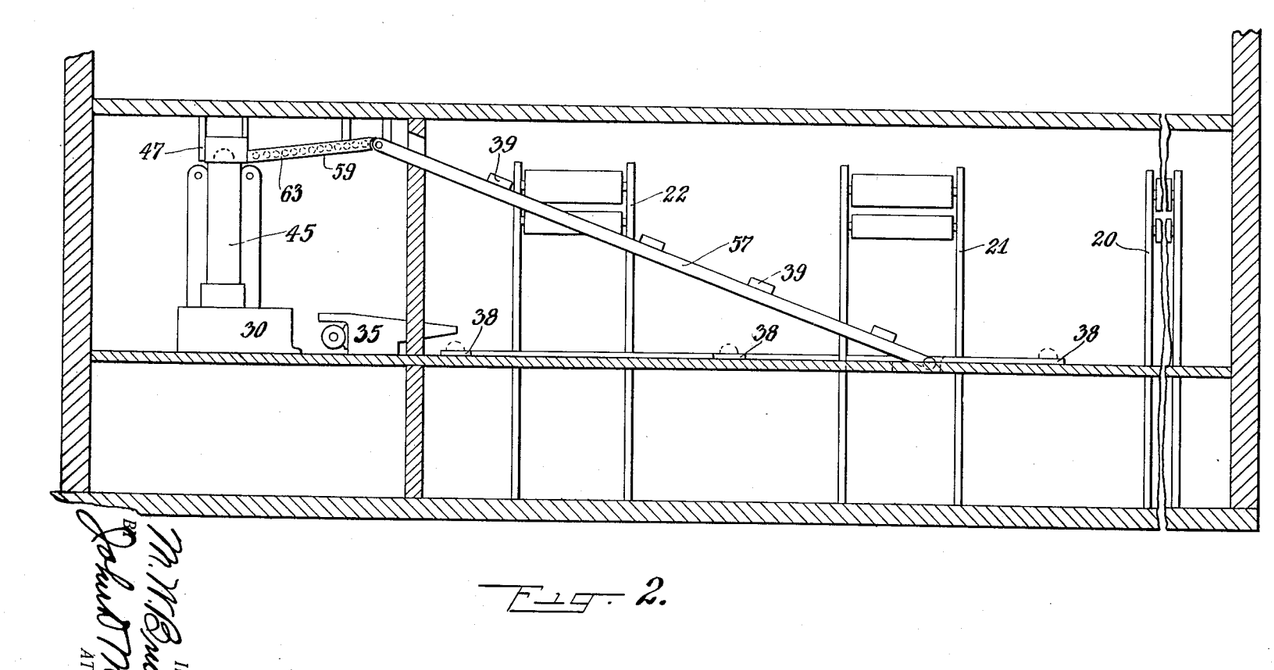
Fig. 2 is an enlarged, diagrammatic, transverse elevation, with parts broken away, and taken substantially on line 2—2 of Fig. 1.
Figure 3:
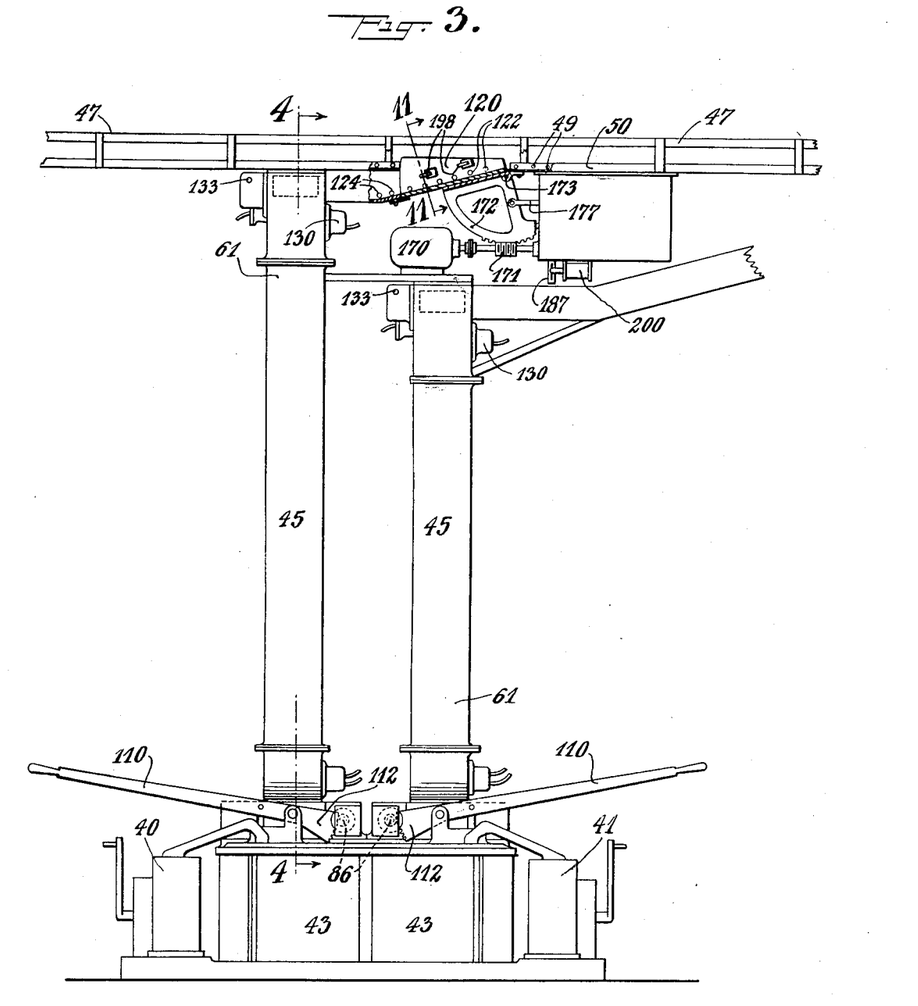
Fig. 3 is an enlarged, detail elevation, certain parts being shown in section, of one of the plate-casting mechanisms and of the plate reserve mechanism therefor.

As illustrated in the embodied form of the invention, the means for diverting the used and discarded plates from the conveyor which has brought them from the press side to a point over one of the individual reserve hoppers comprises a portion 120 of the conveyor frame, provided with freely rotatable rollers 122, the frame being pivotally supported at the end nearest the press end of the conveyor. Means are also provided, and will be later described in detail, for moving the pivoted portion 120 of the conveyor from its normal position, with the rollers in the general plane of the conveyor rollers 49, to a downwardly inclined position, as shown in Fig. 3. At the free end of the diverter and cooperating with it when the diverter is in lowered position, are a plurality of rollers 124 mounted in side walls and forming an extension of the diverter, so that as a plate 39 slides down the diverter 120, it will be passed to a point substantially over the stack of plates in the individual reserve hopper 45.

Means are also provided for receiving a used and discarded plate as it is fed downwardly by the diverter and comprise a series of small rollers 126, rotatably mounted on cross-bars 128, running between pairs of sprocket chains 66, 67, the several bars being arranged on opposite sides of the hopper to engage and support the lower flat edges of a used plate 39. By means of these rollers 126, lying in the path of the lower edges of the used plates as they are supplied by the diverter, the plates are singly supported above the stack of plates in the hopper.

Means are also provided for automatically lowering the used plates immediately after they have come to rest on the rollers and above the top of the reserve stack of used and discarded plates and as here embodied, the upper pairs of sprocket wheels 64, 65 mounted on shafts 63 are rotated by motor 130, driving worm 131, keyed to shaft 133 and meshing with worm gear 132. For energizing motor 130 and causing it to rotate the sprocket wheels 64 and 65 to lower the plates onto the stack of plates already in the hopper, or onto the projecting supporting bars 70 and 93, a switch 135 is provided, in the motor circuit, which switch is automatically operated by the incoming used plate 39, diverted from the conveyor 47. The present preferred means for accomplishing this purpose are best shown in Figs. 5 and 10, and comprise a commutator 137, adapted alternately, on successive partial rotations, to close and then to open the motor circuit and cause a corresponding intermittent downward progression of the plate-supporting rollers 126 on sprocket chains 66 and 67.

Figure 10:
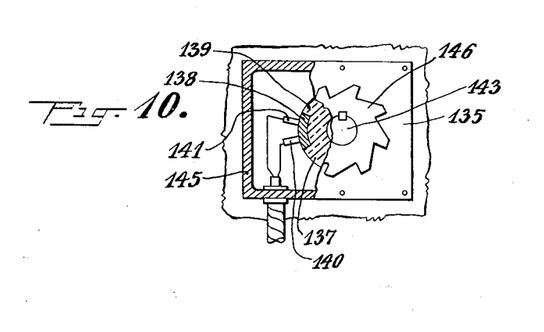
Fig. 10 is a fragmentary detail view, partly in section of the commutator for the plate storing or reserve mechanism shown in Fig. 5.
Figure 11:
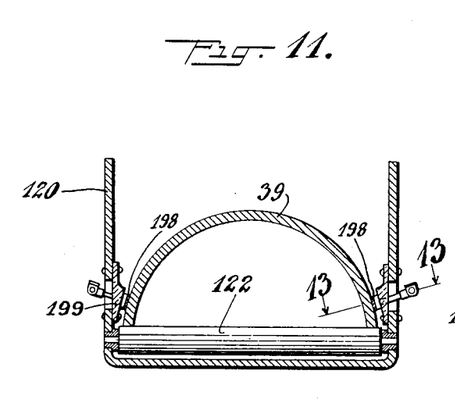
Fig. 11 is a section taken on the line 11—11 of Fig. 3, and shows diverting means for feeding plates from the conveying mechanism to the individual reserves.
Figure 12:
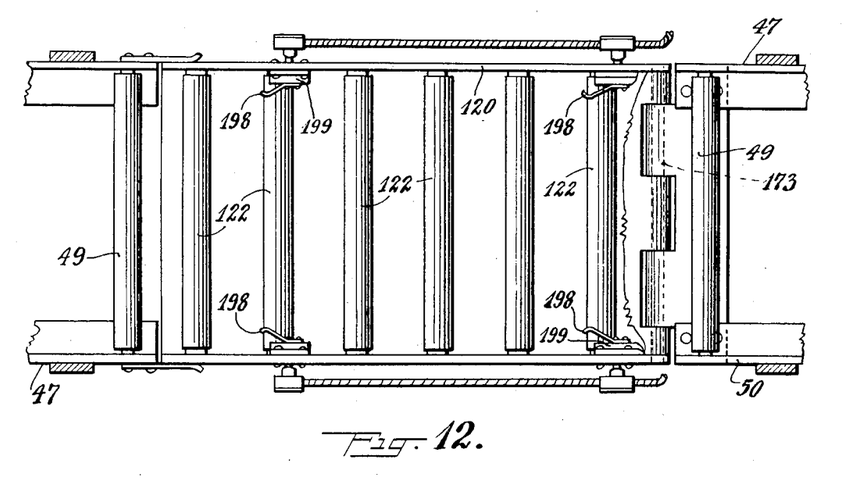
Fig. 12 is a fragmentary plan view of the conveyor and diverting means.
Figure 13:
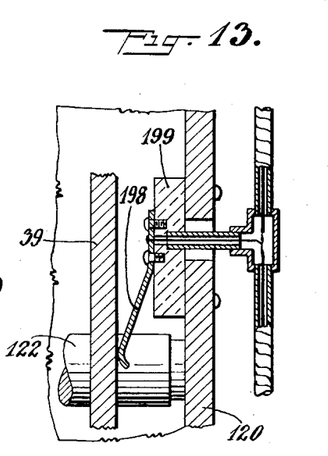
Fig. 13 is a fragmentary detail, in section, of one of the electrical controls and taken on the line 13—13 of Fig. 11.

For imparting the partial successive rotation to the commutator 137 in accordance with the delivery of plates to the top of the hopper and thereby correlating the movement of the chains with the feed of plates, the commutator is formed with alternate conducting and non-conducting sections around its periphery, as shown in Fig. 10, wherein conducting portions 138 of metal are inlaid in recesses formed in the disc of insulating material 139. Brushes 140, 141 contact with the periphery of the disc and are intermittently bridged by contact with the metallic inlays 138. On shaft 143, by which the commutator disc 137 is rotatably mounted in box 145, is fixedly secured ratchet wheel 146 having twice the number of teeth as there are metallic members 138 on the disc.

For partially rotating ratchet wheel 146 and thereby closing the circuit by bridging the brushes 140, 141 each time a plate is fed, a bell crank 147 is pivoted in the top of the reserve hopper and carrying a shoe 148, at one end, which projects into the path of the used plates, so that it is moved by the feeding of the plates to the hopper 45. At the end of the other arm of the bell crank 147 is pivotally mounted a pawl 149, co-operating with the ratchet wheel 146 and as each used plate is fed to the hopper, pawl 149 turns the commutator disc 137 to start motor 130. For pressing the pawl into engagement with the teeth of ratchet 146 and for moving the shoe 148 into the path of the incoming plates 39, springs 150, 151 are provided which accomplish these functions, respectively.

For stopping the motor and causing a consequent cessation of the downward feed of the sprocket chains 66, 67, a second bell crank 153 is provided with a cam portion 155 to swing pawl 156 as a plate is moved downwardly and contacts with the cam portion 155. At the other end of bell crank 153 is provided a spring 157 to return the cam portion 155 into the path of the descending plates upon the next downward motion of the chains 66, 67. Pawl 156, at the outer end of bell-crank is pressed into engagement with the ratchet 146 by spring 159.

Figure 4:
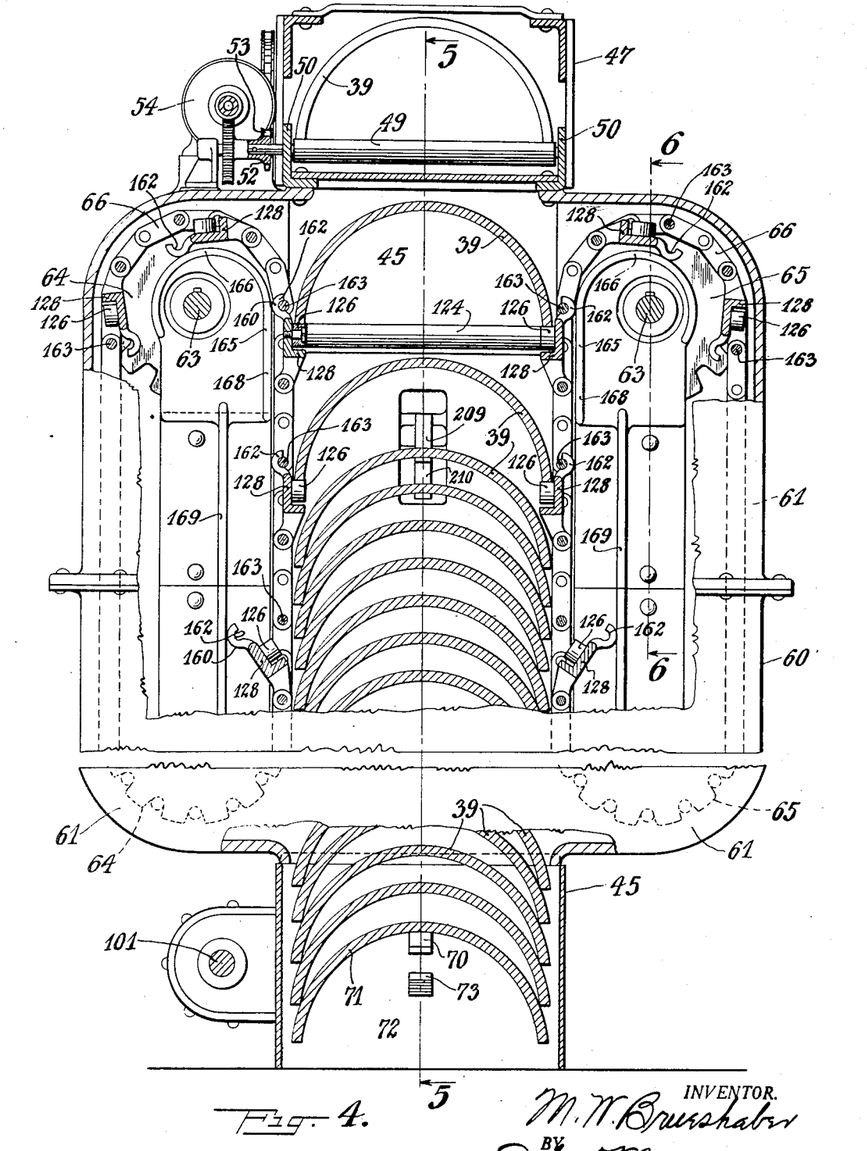
Fig. 4 is a cross-section of the plate storing and reserve mechanism and taken on the line 4—4 of Fig. 3.

Referring more in detail to the construction of the plate-lowering means forming part of the reserve hoppers, a plurality of cross bars 128 are provided on each pair of sprocket chains 66, 67 to increase the speed and capacity of the apparatus, and each of these cross bars 128 is pivoted between the pairs of the chains so that the rollers 126 can be projected into the path of the plates and then retracted to stack the plates. Supporting the cross bars and rollers while they are in engagement with a plate, the cross bars 128 are formed with an upwardly projecting arm 160, having open-hooked ends 162 to engage an adjacent cross rod 163 running between the sprocket chains 66 and 67. This hooked end keeps the cross bars 128 from moving inwardly to a too great extent. For pushing the cross bar and rollers into the path of the plates, a projecting rib 165 having spiral-shaped portion 166 is provided to cooperate with the rounded portion of the hook ends 162 and correctly position the rollers 126, as shown in Fig. 4. The rollers are held in this position by the straight portion 168 of the rib 165, extending parallel with the sprocket chains 66, 67 until the plates have been deposited on top of the reserve stack of used plates, and then the rounded upper side of the top plate 39 of this stack of plates pushes the rollers 126 and cross bars 128 outwardly to free the new plate and drop it a short distance onto the stack. For preventing the cross bars 128 from falling over and hanging downwardly, ribs 169 are provided, extending parallel with the sprocket chains, and set farther from the chains than rib 165.

As previously stated, there is preferably provided a reserve hopper 45 corresponding to each of the melting pots of the several casting machines and the construction of these several individual reserve hoppers can be, and preferably is, substantially identical. For this reason the remaining reserve hoppers will not be described in detail.

Referring now to the present illustrative embodiment of the means for controlling the diverters above the individual reserve hoppers and for automatically maintaining therein a reserve of used and discarded plates, means are provided for automatically lowering the pivoted portions of the conveyor for diverting used and discarded stereotype plates from the horizontal reach of the conveyor and into one individual reserve hopper as the stack of plates in that hopper becomes exhausted and for continuing this diversion until the reserve stack of plates has been replenished and the stack contains a predetermined number of plates, at which time other means are brought into operation for raising the diverter and causing the plates to travel along the conveyor to the next individual reserve hopper which happens to be in condition to receive them.

As embodied, the means for automatically lowering each of the several diverting portions 120 of the conveyor each comprises a motor 170 driving worm gears 171, meshing with a segment 172 mounted on the lower side of the pivoted section 120 of the conveyor 47, the segment being concentric with the pivot 173. When motor 170 is started, in a forward direction, the segment 120 is lowered and the conveyor section lowers with it. For stopping the motor 170, when the segment and pivoted section of the conveyor have been sufficiently lowered, a switch 175 provided in the motor circuit and biased by spring 176 to assume a closed position, is opened when a diverter 120 has reached the desired lower portion by means of a push rod 177 pivoted to segment 172. Means are also provided for automatically initiating the operation of the motor to lower the diverter or pivoted portion of the conveyor when the stack of plates in the reserve hopper has become depleted and comprise a switch 178 including contacts 180, and adapted to be bridged by a contact piece 181 carried by a pivoted bell crank 182 which contact piece is raised from the contacts 180, by the pressure of spring 183 when arm 184 of bell crank 182 is not held down by the edge of a used and discarded plate near the bottom of the hopper. When this switch 178 is closed the current from the main flows through solenoid 185 to turn lever 187 about pivot 188, thereby raising rod 177, lifting catch 189 and allowing spring 190 to close contacts 192, thereby completing the motor circuit and starting motor 170.

With the pivoted section of the conveyor in lowered position, the used and discarded plates travelling along the conveyor after being discarded from the press are diverted into the top of the hopper and are stacked on top of the plates already contained therein.

Means are provided for temporarily preventing movement of each of the pivoted sections of the conveyor at any time when there is a used and discarded plate on that section and comprise a relay 195, in the diverter raising circuit, later to be described, and a solenoid 194 in the diverter lowering circuit for opening switch 178 regardless of the presence or absence of a plate near the bottom of the hopper and for energizing this relay and solenoid, spring brushes 198 are mounted on insulating blocks 199 at either side and along the sides of the pivoted sections 120 of the conveyor in such a way that a plate passing along this section of the conveyor will contact with the brushes on opposite sides of the conveyor, close this safety circuit and open the forward and reverse motor circuits, thereby exercising a master control over the other circuits and preventing jamming or injury to any of the mechanism.

As here embodied, means are preferably provided for manually causing the pivoted section of the conveyor to be lowered so that the reserve can be replenished before the reserve of plates has been diminished to such an extent as to cause the operation to occur automatically, and comprise a second solenoid 200 and armature 201 operable to move bell crank 187, thereby raising push rod 177 and closing motor switch 192, and a manually operable switch, such as push button 202, in circuit with the solenoid 200, by which the solenoid can be energized to effect the operation of the motor as desired.

For protecting the electrical apparatus in the circuit and preventing the flow of current through solenoid 185 when there is no plate to open switch 178, a switch 204 is provided, operable on extreme downward movement of the pivoted section 120 of the conveyor, to open the circuit for solenoid 185 by means of bell crank 205, movable on contact with the end of segment 172. By this arrangement, the solenoid 185 remains energized only long enough for motor 170 to lower the segment into its diverting position.

In the illustrative embodiment of the invention, means are provided for automatically raising the pivoted diverting section of the conveyor as soon as the reserve stack of used and discarded stereotype plates has been replenished in the individual reserve hoppers, and comprise a motor energizing circuit in which are switches, adapted to be automatically closed when the reserve has been sufficiently replenished. As shown, a plurality of switches 207, 208, connected in series, are located near the top of the stack and provided with projecting arms 209, 210, resiliently urged into the path of the descending plates by springs 211. As plates are fed into the top of the stack and are fed downwardly by the sprocket chains 66, 67, the switches 207, 208 are sequentially closed as the plates pass by them and when the stack has been replenished the two plates at the top of the stack cause both switches to be closed simultaneously and energize the motor circuit.

For reversing the direction of rotation of the motor after each operation, a reversing switch 215 is provided having an operating lever 216 controlled by the push rod 177, whereby operation of the motor in one direction prepares it for operation in the other direction.

For automatically stopping the rotation of the motor when the diverter has been fully raised, switch 192, in the motor circuit, is adapted to be opened by movement of catch or trip 189 on push rod 177.

Figure 14:
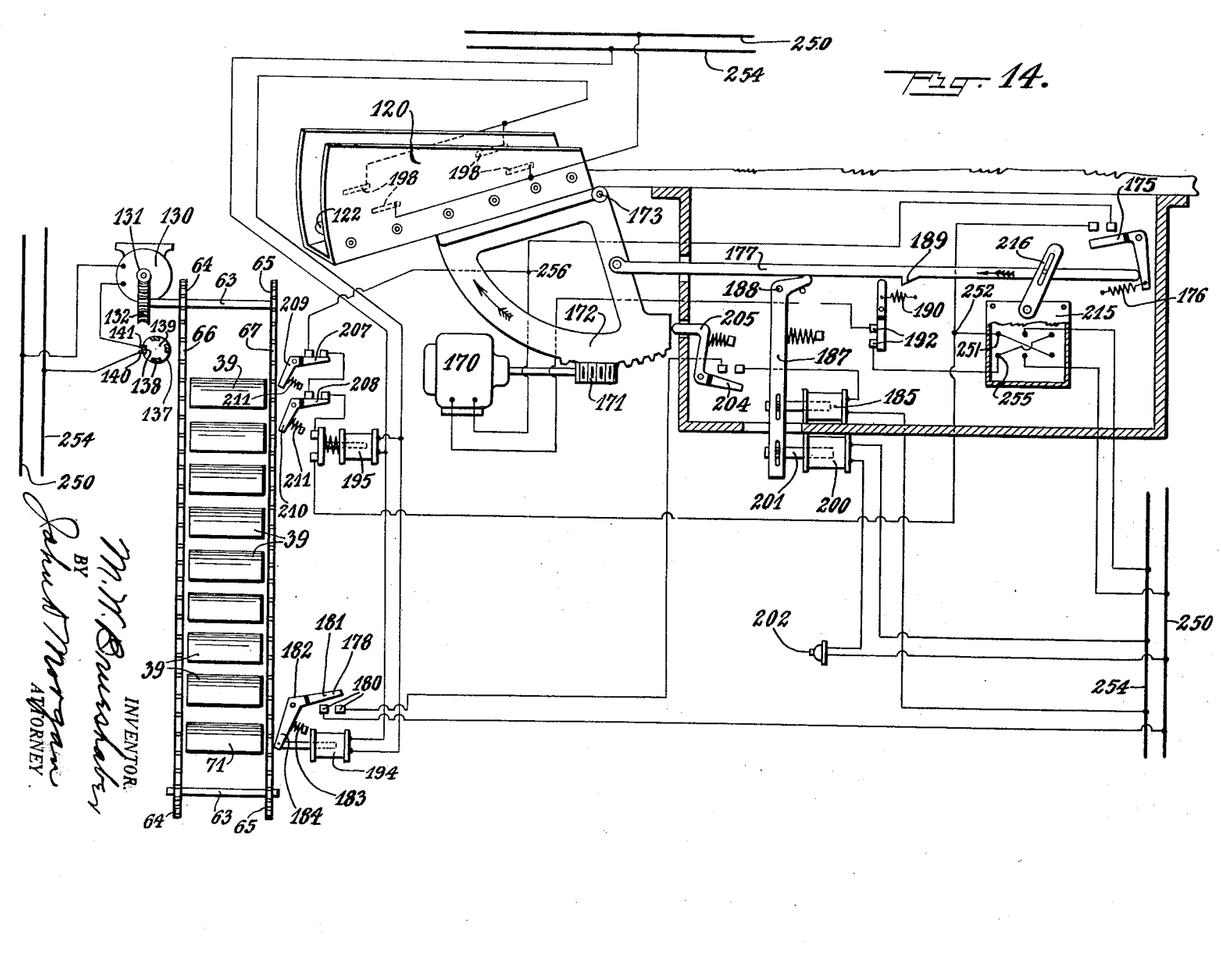
Fig. 14 is a diagrammatic view showing the electric circuits and mechanism for maintaining the reserve or plate storing means supplied with plates as the plates are fed to it, and away from the press, by the conveyor.

The electrical circuits of the illustrated preferred embodiment may be conveniently traced as follows:—

*The motor circuits.*—From one side of the main 250 to a central contact of reversing switch 215, and through contact 251 to point 252, then through switch 175, to motor 170, to switch 192, and through the reversing switch 215 to main 254. For reversing the motor, the circuit is as follows: from main 254 to reversing switch 215, to contact 251, to point 252, through safety relay 195, through switch 208, then switch 207, to point 256, to motor 170, through switch 192, through reversing switch 215 and out to main 250. The safety circuit is:—from main 254 through the coil of relay 195, to brushes 193, through a plate 39 on the pivoted section of the conveyor, through other brushes 198 and out to main 250 with solenoid 194 shunted across relay 195. The automatic motor-starting circuit: from main 250 to switch 178, through switch 204, through solenoid 185 and out to main 254. For manually starting the motor: from main 250, through push-button 202, through solenoid 200 and out to main 254. For lowering the plates in the individual reserve hoppers: from main 250 through motor 130 to brush 141, through bridge 138 and out through brush 140 to main 254.

An individual reserve mechanism, as described above, with corresponding electrical control and actuating means, is preferably provided for the melting pot of each of the casting mechanisms. As the plates are travelled by the conveyor, after having been discarded from the press, it is obvious that they will be stacked in the first hopper which has become sufficiently depleted to operate the diverter, and after this stack has been replenished, the used plates will be passed to another lowered diverter to replenish the depleted reserve in another hopper.

The operation of the above-described mechanism is substantially as follows:—

One of the presses 20, 21 or 22 is stopped and the plates thereon are to be changed. The stereotyper, having placed a mat in one of the stereotype casting mechanisms and suitably prepared the casting mechanism for operation in other ways, pulls lever 110 downwardly and then raises the lever to its upper position, thereby withdrawing a sufficient quantity of metal from the reservoir 43 of molten metal to cast the desired plate. The same movement of the casting lever 110 releases a used and discarded plate from the corresponding individual reserve hopper 45 and drops it into the reservoir 43 where it is melted and becomes a part of the molten mass of stereotype metal. As soon as the plate cast has solidified, the mold is opened and the plate is transferred to the stereotype finishing machine where it is trimmed and milled to make it ready for the press, the finishing machine discharging the plate onto conveyor 38 which travels the plate to the press awaiting the plate.

Before the newly cast plate is put on the press, the old plate, which has run the previous edition, is removed and placed on conveyor 38 which carries it and transfers it to conveyor 57, to conveyor 59, and then to conveyor 47. Conveyor 47 moves the plate along the horizontal stretch of the conveyor until the plate reaches a lowered pivoted section 120 of the conveyor over a depleted reserve stack of used plates. This lowered section or diverter drops the plate from the conveyor to the top of one of the reserve hoppers where it is supported by rollers 126, and hits shoe 148 causing motor 130 to lower the plate in the hopper. As another plate is travelled along the conveyor, it is similarly lowered into the hopper until the individual reserve is replenished, at which time both switches 207 and 208 are closed, energizing motor 170 which raises the diverter and allows subsequent plates to be fed to another depleted reserve. As another reserve becomes depleted, switch 178 is closed, energizing the motor 170 of the corresponding diverter, lowering this diverter and replenishing that reserve. By reason of the fact that the diverters are lowered before all the plates in the corresponding reserve have been released into the melting pot below it, at least one of the diverters, under normal conditions, will be ready to receive plates from the conveyor. When two or more reserves are depleted with their corresponding diverters in lowered position, the reserve nearest the press will receive the used and discarded plates as they are conveyed to it until the reserve is replenished, and then the diverter will be raised passing the plates to the next depleted reserve. As there is a substantially constant quantity of metal in the system, no one of the individual reserves is liable, under normal conditions, to become entirely depleted, nor will any one be filled too full.

Figure 15:
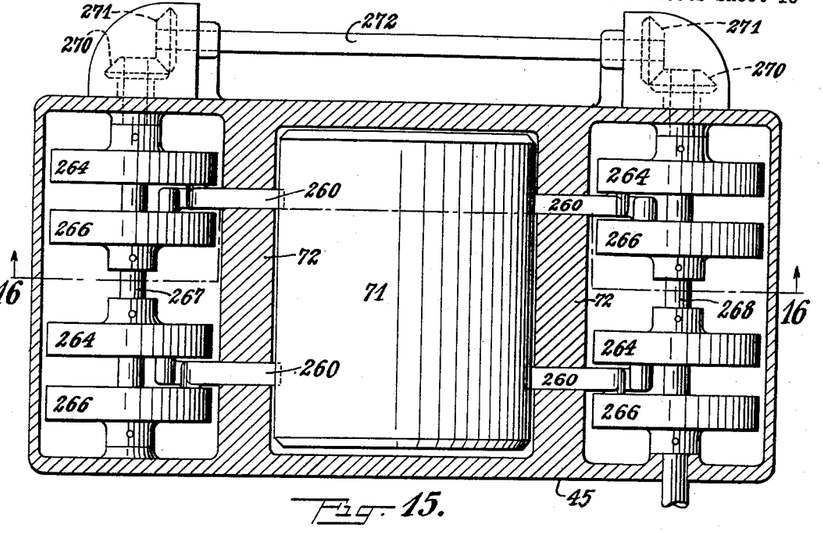
Fig. 15 is a sectional view of a modified form of plate releasing mechanism for supplying plates to the melting pot or reservoir of molten metal of the casting mechanism as plates are cast thereby.

According to the modified form of the invention, means are provided for supporting the used and discarded stereotype plates in the individual reserve hoppers by engagement with the edges of the plates, instead of with the top of the plates as was the case with the mechanism previously described. In this modified embodiment of the invention there are provided a plurality of retractable bolts 260 slidable in slots formed in the bottom 72 of the hopper, and these bolts support the stack of used and discarded plates by engagement with the bottom straight edges of the bottom plate 71 in the stack. For supporting the plates, after the bolts 260 have been retracted and have allowed the stack of plates to descend, there is provided a second set of similarly retractable bolts 262, slidable in the bottom wall of the hopper and positioned below the bolts 260 a distance slightly less than the distance between the bottom edges of superposed plates in the reserve stack.

For moving bolts 260 and 262 oppositely to lower the stack of plates in the individual reserve hopper and discharge the plates singly into the melting pot or reservoir of molten metal, there are provided a series of cams 264 and 266 cooperating with bolts 260 and 262 respectively, which cams serve to project bolts 260 into the central portion of the hopper as bolts 262 are retracted.

Figure 8:
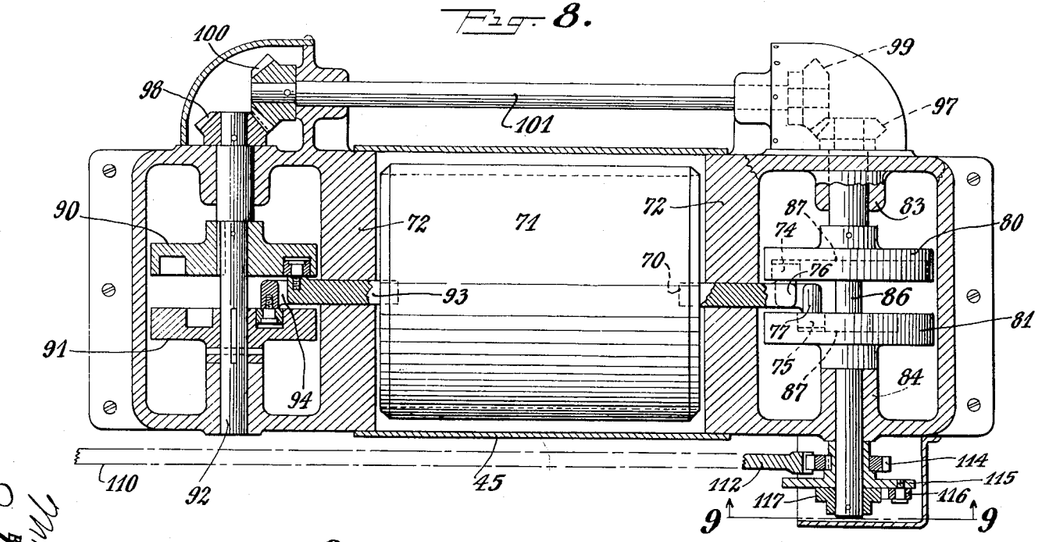
Fig. 8 is a cross-section, taken on the line 8—8 of Fig. 5, showing the means for releasing used plates from the reserve or storing means.
Figure 16:
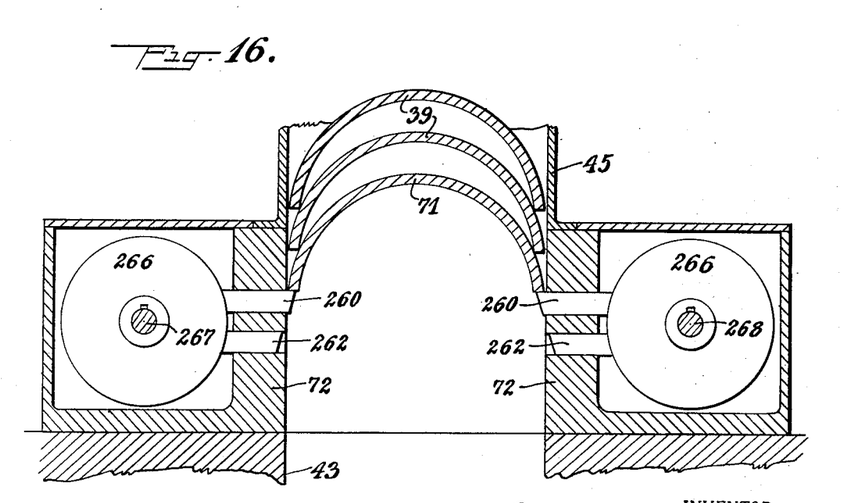
Fig. 16 is a section taken on the line 16—16 of Fig. 15.

Cams 264 and 266 mounted on shafts 267 and 268 are similar in their construction and operation to cams 80 and 81, as shown in Fig. 8, and need not be further described in detail. For moving the cams 264 and 266 in unison and in accordance with the casting of plates by the stereotype casting mechanism, shafts 267 and 268 are provided on one end with bevel gears 270, meshing with bevel gears 271 on shaft 272, shaft 268 being rotated by the operation of casting lever 112 through suitable connecting mechanism which may be of the form shown in Fig. 8.

The invention in its broader aspects is not limited to the specific mechanism shown and described but departures may be made therefrom within the scope of the accompanying claims without departing from the principles of the invention and without sacrificing its chief advantages.

What I claim is:—

1. A mechanism for supplying used stereotype plates to a casting machine including in combination means for conveying plates away from a press as they are discarded from the press, means for supporting a reserve of used plates adjacent to the casting mechanism, and means for diverting plates from said conveyor to said reserve as the reserve becomes depleted.

2. A mechanism for supplying used stereotype plates to a casting machine including in combination means for conveying plates from a press as they are discarded from the press, means for supporting a reserve of said plates adjacent to the casting mechanism, means for regulably supplying the reservoir of said casting mechanism with plates as new plates are cast thereby, and means for diverting plates from said conveyor to said reserve as the reserve becomes depleted.

3. A mechanism for supplying used stereotype plates to a casting machine including in combination means for conveying plates from a press as they are discarded from the press, means for supporting a reserve of said plates adjacent to the casting mechanism, means for regulably supplying the reservoir of said casting mechanism with plates as new plates are cast thereby, means for diverting plates from said conveyor to said reserve as the reserve becomes depleted, and means for interrupting said diverting means when the reserve is replenished.

4. Stereotype plate mechanism including in combination a plurality of plate casting mechanisms having molten metal reservoirs, a conveyor for conveying plates from a press to the casting mechanisms, and means for selectively controlling the supply of plates from said conveyor to said casting machines in accordance with the casting operation of the casting machines.

5. Stereotype plate mechanism including in combination a plurality of plate casting mechanisms having molten metal reservoirs, and conveying means receiving used plates from a press and running past the casting mechanisms for selectively supplying discarded plates from the press to said reservoirs proportionally to the casting of plates by said casting machines.

6. Stereotype plate mechanism including in combination a plurality of plate casting mechanisms having molten metal reservoirs, a conveyor for conveying plates from a press to the casting mechanisms, means for supporting a stack of used stereotype printing plates adjacent to each reservoir, means for supplying a plate from a stack to a reservoir each time a plate is cast, and means for selectively supplying plates from said conveyor to said reservoirs and controlled by the reserve of plates in said supporting means.

7. A stereotype plate casting mechanism including in combination a plurality of casting machines, a conveyor passing a printing press and the casting machines, depositories for each casting machine adjacent to the casting machines, to receive plates from the conveyor and supply them to the casting machines as new plates are cast, and means for controlling the delivery of plates from the conveyor to the depositories.

8. A stereotype plate casting mechanism including in combination a plurality of casting machines, a conveyor for used plates passing a printing press and the casting machines, plate storing means adjacent to the casting machines, means for selectively delivering plates from the conveyor to the storing means and for delivering plates from the storing means to the casting machines in accordance with the casting of new plates.

9. In a stereotyping mechanism, the combinaation of a depository for used stereotype plates to be supplied to a molten metal reservoir, means for supplying plates to said depository and means for controlling the supply means to stop its operation when the depository is filled and to start the supply means when the depository is depleted.

MARTIN W. BRUESHABER.